United States Patent [19]

Chrysler

[11] Patent Number: 5,765,816
[45] Date of Patent: Jun. 16, 1998

[54] SPOUT ASSEMBLY FOR A HYDRANT

[75] Inventor: Jimmie D. Chrysler, Wyoming, Mich.

[73] Assignee: Amerikam, Inc., Grand Rapids, Mich.

[21] Appl. No.: 800,137

[22] Filed: Feb. 13, 1997

[51] Int. Cl.$^6$ .................................................. F16K 31/44
[52] U.S. Cl. ........................................ 251/294; 251/208
[58] Field of Search ................................ 251/205, 208, 251/294, 339

[56] References Cited

U.S. PATENT DOCUMENTS

| | | |
|---|---|---|
| 4,844,116 | 7/1989 | Buehler et al. . |
| 4,971,097 | 11/1990 | Hunley, Jr. et al. . |
| 5,150,737 | 9/1992 | Clerc .................... 251/208 X |

FOREIGN PATENT DOCUMENTS

| | | | |
|---|---|---|---|
| 21635 | of 1906 | United Kingdom | ............... 251/208 X |

*Primary Examiner*—Kevin Lee
*Attorney, Agent, or Firm*—Rader, Fishman, Grauer & McGarry

[57] ABSTRACT

This invention generally relates to fluid valves and, more particularly, to water supply hydrants. The hydrant (40) according to the invention comprises a handle assembly (60) which is operationally mounted to a valve (100) which, in turn, is fluidly interconnected to a source of pressurized fluid. The handle assembly is configured so that a limited amount of rotation of the handle assembly actuates the valve. In one embodiment, the handle assembly is provided with an axial conduit which is adapted to dispense fluid delivered from the valve. In another embodiment, a flexible conduit is located between the handle assembly and a body portion of the hydrant so that the fluid dispensed from the hydrant can be aimed in a particular direction.

11 Claims, 2 Drawing Sheets

SPOUT ASSEMBLY FOR A HYDRANT

BACKGROUND OF THE INVENTION

1. Field of the Invention

This invention generally relates to fluid valves and, more particularly, to water supply hydrants.

2. Description of the Related Art

A frost-resistant sill cock or hydrant typically includes an elongated tubular body with a valve mechanism at a first end and with a spout and a valve operator at a second, opposing end. Typically, the operator is a handle, and an elongated actuator rod or stem extends within the tubular body between the handle and the valve, whereby manipulation of the handle moves the valve between open and closed positions. A predominant valve mechanism is what may be termed a "plunger valve." wherein a valve plunger or stopper is screw-actuated into and out of sealing engagement with a valve seat. The spout typically has a hose nipple which is disposed in an angular position below the handle and usually has threads adapted to receive an end of a length of hose.

It has been found that the screw-actuated valve is impractical in many applications of the hydrant. These types of valves often require several "turns" of the handle to fully open the valve. Further, the angular position of the hose nipple below the handle can create additional problems. First, the angular hose nipple is typically a separate piece which requires additional manufacturing and assembly steps. Second, the hydrant takes up a large amount of vertical space because of the position of the hose nipple below the hydrant body. Third, the angular position of the hose nipple below the hydrant body is also often inconvenient for attaching a hose, perhaps due to the proximity of a nearby wall, by the body of the hydrant, or other interfering object.

SUMMARY OF THE INVENTION

The present invention provides a hydrant having a casing for connection with a fluid source and a valve cartridge positioned in the casing. The valve cartridge includes a cartridge body with a ceramic disk valve mounted in the cartridge body, and movable between an open position allowing fluid flow and a closed position blocking fluid flow. An actuator stem extends from the valve for manipulating the valve between the open and closed positions. The stem generally extends away from the cartridge body. A handle is mounted to the casing and has a conduit in communication with the stem. Thus, a fluid passage is defined through the cartridge body, the valve, and the stem.

In one aspect of the invention, a handle assembly is provided to the hydrant for the valve which requires a one-quarter or one-half turn of full actuation of the valve.

In another aspect of the invention, a handle assembly is provided to the hydrant which has an axial hose nipple located in the handle so that actuation of the handle causes fluid to flow axially through the handle assembly.

In yet another aspect of the invention, a handle assembly includes a length of flexible hose located between the handle and the hydrant body so that actuation of the handle causes fluid to flow through the hose and out through an axial hose nipple in the handle. The length of flexible hose allows greater positioning of the handle assembly to dispense fluid in a particular direction.

These and other features, objects, and benefits of the invention will be recognized by those skilled in the art, from the specification, the claims which follow, and the attached drawings.

DESCRIPTION OF THE PREFERRED EMBODIMENTS

Figure 1:
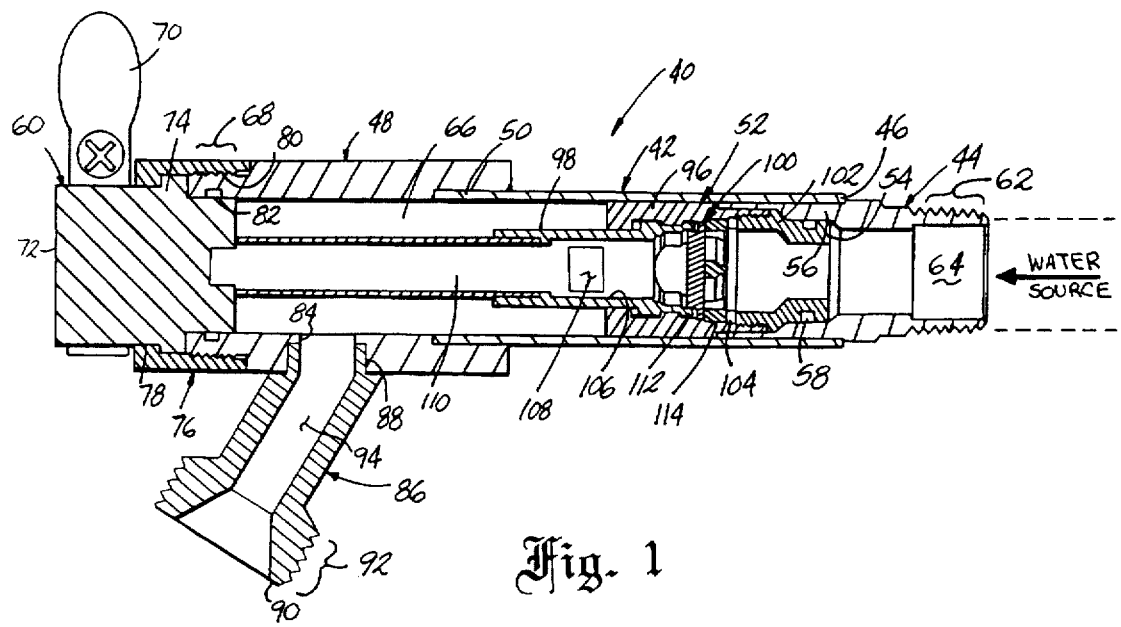
FIG. 1 is a longitudinal section view of a first embodiment of a hydrant according to the present invention.

Referring to the drawing figures and FIG. 1 in particular, a hydrant 40 according to the present invention includes a casing or body tube 42, a seat adapter 44 connected at a first end 46 of body tube 42 for connection with a fluid supply (not shown), and further includes a spout a spout 48 connected at a second end 50 of body tube 42, opposite the first end 46. A valve cartridge 52 is slip-fit into position within body tube 42 and is preferably located near the first end 46. One end 54 of the valve cartridge 52 can engage within a similarly shaped wall 56 in the seat adapter 44 and received a conventional O-ring 58 therebetween. Hydrant 40 also includes a handle assembly 60 connected with valve cartridge 52 and located at spout 48.

Body tube 42 is preferably a length of three-quarter-inch diameter copper tubing or other tubular material as is commonly known and used for plumbing fixtures. Thus, the wall 56 of the seat adapter 44 can be sized for press-fit engagement into conduit end 56, or may be sized for slip-fit engagement and soldering connection with body tube 42 as is commonly known for plumbing components. At a second, opposing end of seat adapter 44, external threads 62 and an internal cylindrical bore 64 are provided for either screw or solder connection with the fluid supply as is commonly known and practiced.

In this embodiment, spout 48 is a commonly available cast bronze or brass member with a cylindrical bore 66 adapted to receive conduit end 50 for a press-fit or solder connection. External threads 68 are provided at an end of spout 48 opposite the connection of spout 48 with the second end 50 of the body tube 42.

The handle assembly 60 includes a handle 70 mounted to a cylindrical body 72 which can be grasped by a user and rotated to actuate the hydrant 40. The handle assembly 60 further comprises an annular flange 74 which extends radially outwardly from the body 72 inwardly from the handle 70.

The handle assembly 60 is mounted to the spout 48 opposite the body tube 42 by a sleeve 76 which has an inwardly-extending radial ridge 78 at one end and internal threads 80 at an opposite end. The sleeve 76 is received on the body 72 of the handle assembly 60 so that the annular flange 74 is axially received behind the radial ridge 78 of the sleeve 76. The threads 80 of the sleeve 76 are engaged with the threads 68 on the spout 48 so that the end of the spout 48 and the radial ridge 78 form a bearing which rotatably mounts the annular flange 74. An O-ring 82 can be located between the handle assembly 60 and the spout 48 to enhance a sealing engagement therebetween.

The spout 48 is further provided with an aperture 84 located in a lower surface thereof A conventional hose nipple 86 has a first end 88 which defines a cylindrical wall adapted to mount within the aperture 84 of the spout 48. A second end 90 includes external threads 92 adapted to fluidly mount to a length of hose (not shown). An angular conduit 94 extends between the first and second ends 88 and 90, respectively.

Valve cartridge 52 includes a cartridge body 96, an actuator stem 98, a valve 100, a retainer 102, and a cartridge seal 104. Cartridge body 96 is most preferably made of brass as is commonly known for plumbing components, but may also be made from any other suitable material, including, but not limited to, plastics and metals other than brass, for example. Cartridge body 96 is generally cylindrical with an aperture extending coaxially therethrough. As will be described in greater detail below, the aperture is also generally cylindrical and includes a portion defining a stem rotation limit chamber and a stem positioning stop or shoulder.

Actuator stem 98 is a generally cylindrical member having a coaxial bore 106 extending therethrough and having a least one transverse opening 108. Actuator stem 98 further includes an axial stem extension 110. Stem extension 110 may be made from any suitable material, but is most preferably made from a length of copper tubing. The stem extension 110 is fixedly mounted at each end to the handle assembly 60 and the actuator stem 98, respectively, so that rotational motion imparted to the body 72 of the handle assembly 60 is transmitted through the stem extension 110 to the actuator stem 98. A conventional vacuum breaker assembly or anti-siphon device can be mounted within the actuator stem 98 as desired.

An end 112 of actuator stem 98, opposite stem extension 110 is adapted to engage valve 100. Valve 100 is preferably a ceramic disk valve, including a disk stack 114 with a fixed disk 116 and a rotating disk 118 which abut one another in sealing face-to-face relation as disclosed in greater detail in commonly assigned U.S. Pat. No. 5,174,324, entitled CERAMIC VALVE and issued on Dec. 29, 1996, to Chrysler, the disclosure of which is incorporated herein by reference.

Figure 2:
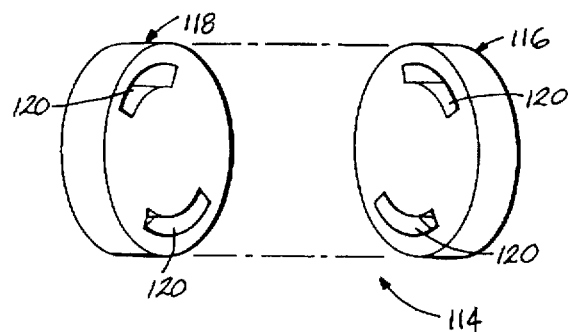
FIG. 2 is an exploded view showing valve components arranged for one-quarter turn actuation of the hydrant with the remaining elements of the invention removed for clarity.
Figure 3:
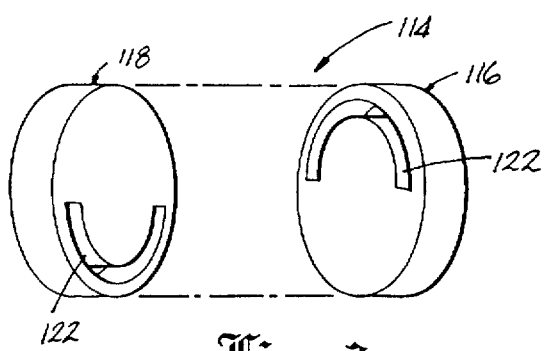
FIG. 3 is an exploded view showing valve components arranged for one-half turn actuation of the hydrant with the remaining elements of the hydrant removed for clarity.

FIGS. 2 and 3 show first and second arrangements of the valve 100 for quarter-turn and half-turn actuation, respectively. It will be understood that common reference numerals are used to describe common features of the first and second arrangements in FIGS. 2–3. Each of the fixed disk 116 and the rotating disk 118 is provided with apertures 120 (FIG. 2) and 122 (FIG. 3) which align when the rotating disk 118 is rotated in a first direction to an open position relative to the fixed disk 116. The apertures 120 and 122 move out of alignment and become blocked by the non-apertured portions of the fixed disk 116 and the rotating disk 118 when the rotating disk 118 is rotated in a second, opposite direction to a closed position relative to the fixed disk 116. FIG. 2 shows apertures 120 as approximately 90° chords or sectors of the fixed and rotating disks 116 and 118 which are disposed in a mirrored relationship. FIG. 3 shows apertures 122 as approximately 180° chords or sectors of the fixed and rotating disks 116 and 118 which are also disposed in a mirrored relationship. It will be understood that other arrangements of the apertures 120 and 122 can be provided without departing from the scope of this invention.

The rotating disk 118 is interconnected to the handle assembly 60 through the actuator stem 98 and stem extension 100. Stops (not shown) can be provided in the valve 100 or on the actuator stem 98 to limit the rotation of the rotating disk 118 to one-quarter or one-half turn of the handle assembly 60, however, the stops are not necessary because the alignment of the apertures in the valve 100 controls the flow of fluid therethrough.

Retainer 102, like cartridge body 96, is preferably a brass member and is fit within an end of seat adapter 44 and is threadingly received within an end of cartridge body 96. The retainer 102 serves to mount the actuator stem 98 and valve 100 to the seat adapter 44.

The valve 100 is normally in a closed position wherein the apertures in the fixed disk 116 and the rotating disk 118 do not overlap. To operate the hydrant 40, the handle 70 is rotated which, in turn, rotates the body 72, the attached stem extension 110 and the actuator stem 98. The rotating disk 118, which is mounted to the actuator stem 98, rotates with the movement of the above-described components to bring its associated apertures in alignment with the corresponding apertures in the fixed disk 116. Fluid is thereby allowed to flow through the aligned apertures in the valve 100.

The fluid then flows through the coaxial bore 106 in the actuator stem 98, through the transverse opening 108 therein, and into the cylindrical bore 66 of the spout 48. Thereafter, the fluid flows through the aperture 84 in the spout 48, into the angular conduit 94 of the hose nipple 86 and is dispensed through the second end 90 thereof.

The handle 70 can be returned to the original closed position to rotate the apertures of the rotating disk 118 out of alignment with the apertures in the fixed disk 1 16 to stop the flow of fluid therethrough. In addition, the handle 70 can be set at an intermediate position to set the flow rate of the fluid at a position between off and fully on.

Figure 4:
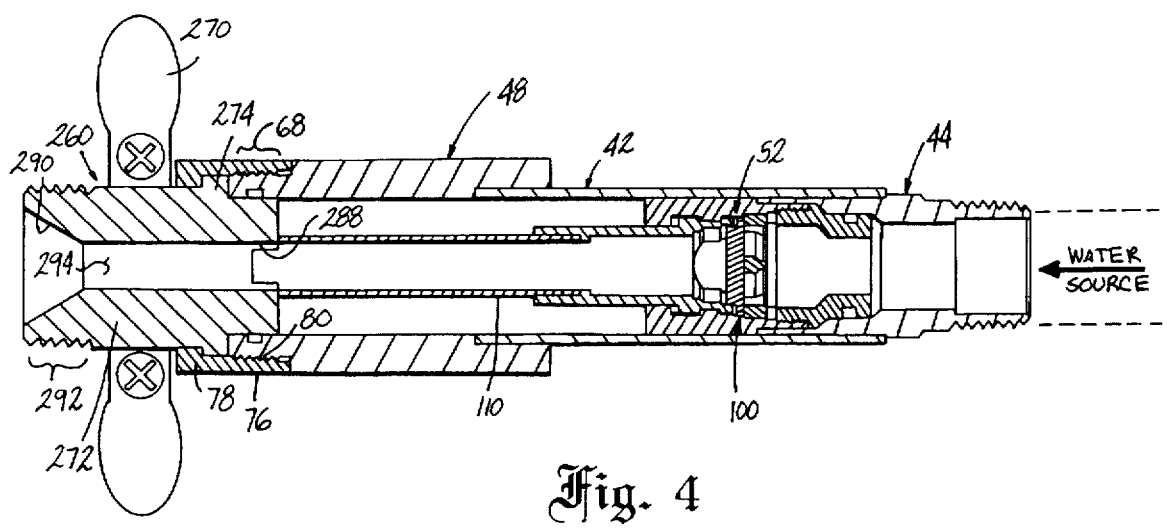
FIG. 4 is a longitudinal section view of a second embodiment of the hydrant according to the invention.
Figure 5:
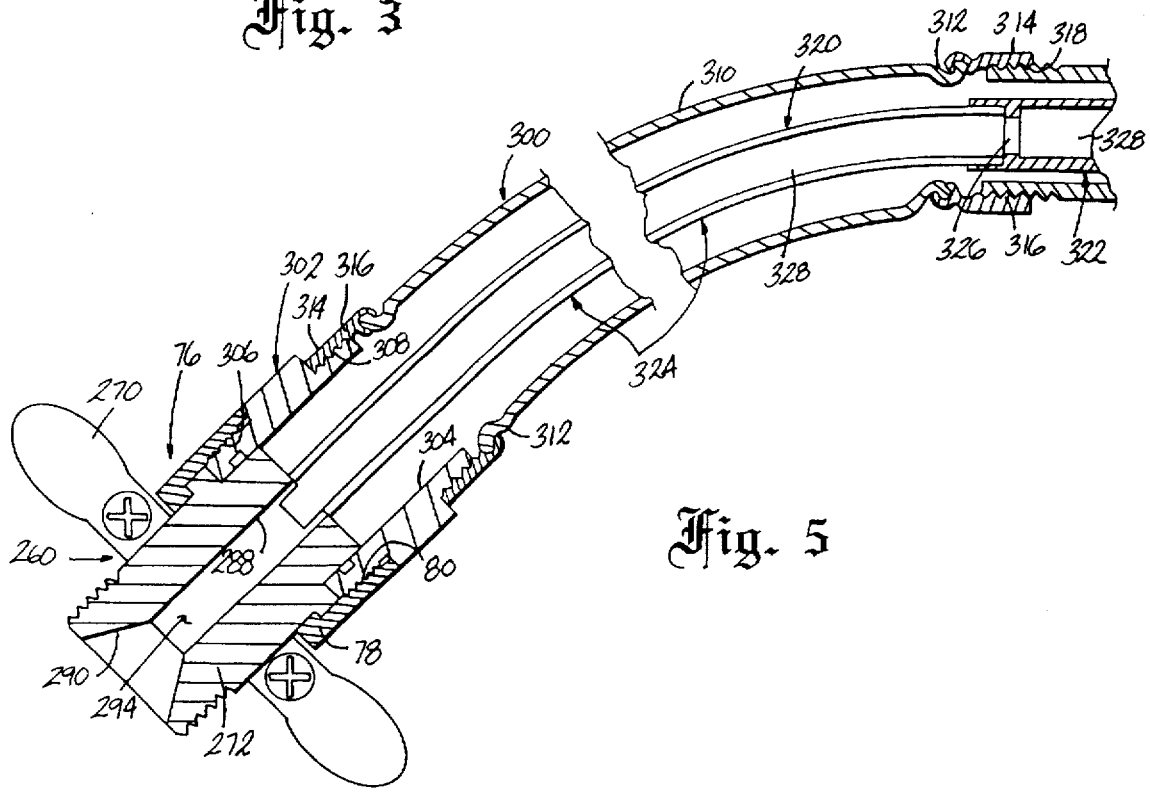
FIG. 5 is a longitudinal section view of a third embodiment of the hydrant according to the invention with the remaining elements of the invention removed for clarity.

FIGS. 4 and 5 show second and third embodiments of a hydrant having a modified handle assembly according to the invention wherein the handle assembly includes an axial hose nipple. Actuation of the handle assembly causes fluid to flow axially outward through the handle assembly. It will be understood that the reference numerals in FIGS. 4 and 5 are the same as in the first embodiment of FIGS. 1–3 to identify common elements or features. It will be further understood that the reference numerals are greater by 200 and 300 in FIGS. 4 and 5, respectively, to identify modified or new components contained therein.

FIG. 4 shows a second embodiment of the hydrant 40 having a modified handle assembly 260. It will be understood that the body tube 42, seat adapter 44 and valve cartridge 52 are identical components as described in the first embodiment shown in FIGS. 1–3. A spout 48 is the same as in the previous embodiment except that a lower aperture, earlier referred to by reference numeral 84 is not present. The spout 48 is provided with external threads 68 opposite the mounting of the spout 48 to the body tube 42 as in the first embodiment. The valve cartridge 52 includes a stem extension 110 which interconnects the handle assembly 260 with the valve 100.

The handle assembly 260 comprises a cylindrical body 272 which mounts a handle 270. As in the previous embodiment, the body 270 includes an annular flange 274 which extends radially outwardly from the body 272 inwardly from the handle 270. The cylindrical body further includes an axial conduit 294 having a first end 288 and a second end 190. The end 288 is adapted to mount an end of the stem extension 110. The second end 290 can include an outwardly-beveled interior surface. The conduit 294 and its associated ends comprises a hose nipple 286 disposed within the handle assembly 260. The exterior end of the body 272 can be provided with external threads 292 which surround the conduit 294 and are adapted to mount on end of a length of hose.

A sleeve 76 is provided having a radial ridge 78 and internal threads 80 as in the first embodiment. The sleeve 76 mounts the handle assembly 260 to the spout 48 so that the annular flange 272 is mounted for rotational movement between the radial ridge 78 of the sleeve 76 and the spout 48. The conduit 294 fluidly communicates with the interior of the stem extension 110 and is thereby fluidly interconnected to the valve 100. Actuation of the handle assembly, i.e., rotation of the handle 270, causes the valve 100 to open and allow fluid to flow axially through the stem extension 110, through the conduit 294, and out of the hydrant 40 through the second end 290 thereof.

FIG. 5 shows a third embodiment of the hydrant according to the invention having the modified handle assembly 260 of the second embodiment which is fluidly interconnected to a flexible extension 300. It will be understood that common reference numerals will identify items previously described with respect to the first and second embodiments. A retainer 302 is provided which fixedly mounts the sleeve 78 so that the handle assembly 260 is mounted for rotational movement. The retainer 302 comprises a sleeve 304 having external threads 306 and 308 at opposite ends thereof. The threads 80 of the sleeve 76 engage the threads 306 of the retainer 302 to mount the handle assembly 260 for rotational movement.

The extension 300 comprises a length of flexible tubing 310 having each end thereof provided with a knurled edge 312 which sealingly mounts a cylindrical flange 314. The flange 314 is provided with internal threads 316. The threads 316 on the flanges 314 engage the external threads 308 on the retainer 302 and a threaded portion 318 of the body tube 42.

A modified stem extension 320 is provided inside the tubing 310 which has a rigid portion 322 and a resilient portion 324. The rigid portion has an inner end (not shown) which is fluidly interconnected with the valve 100 (shown in FIGS. 1–3). The rigid portion 322 and the resilient portion 324 are fixedly mounted together at 326 and define an axial conduit 328 therein. The opposite end of the resilient portion 324 is fixedly mounted to the first end 288 of the axial conduit 294 of the handle assembly 260. The axial conduit 294 of the handle assembly 260 is thereby fluidly interconnected with the axial conduit 328 of the stem extension 320.

The resilient portion 324 of the stem extension is preferably of high torsional strength so that rational motion of the handle assembly 260 is transmitted in whole or in part to the rigid portion 322 and thereby to the valve 100 of the hydrant 40. Depending upon the torsional strength of the resilient portion 324, more rotation of the handle assembly 260 may be required to produce a desired amount of rotation at the mounting 326 between the rigid portion 322 and the resilient portion 324 and, thus, to the valve. The resilient portion 324 also preferably allows for transverse and lateral bending so that the handle assembly 260 can be positioned in three dimensions before, during or after actuation of the handle assembly 260.

The hydrant according to the invention solves the problems of the prior art by providing a hydrant in which little rotation of the handle assembly actuates the hydrant. In addition, the hydrant according to the invention includes a handle assembly having an integral hose nipple axially disposed therein which reduces the number of parts required for assembly. Further, the hydrant of this invention takes up little vertical space because of the elimination of the conventional downwardly-depending hose nipple of the prior art.

Reasonable variation and modification are possible within the spirit of the foregoing specification and drawings without departing from the scope of the invention.

I claim:

1. A hydrant comprising:

a casing adapted to communicate with a fluid source;

a valve cartridge positioned in the casing, the valve cartridge including a cartridge body having first and second opposite open ends, a ceramic disk valve mounted in the cartridge body, the valve being movable between an open position allowing fluid flow axially through the valve in a first direction from the second open end through the first open end and a closed position blocking fluid flow;

a hollow actuator stem connected with the valve for manipulating the valve between the open position and the closed position, the stem having one end in fluid communication with the first open end of the cartridge body, and the other end extending away from the cartridge body; and a handle rotatably mounted to the casing and operatively connected to the stem, said handle having a conduit therethrough in fluid communication with the stem, said conduit having an open end near the handle, wherein a fluid passage is defined through the cartridge body, the valve, the stem, and through the conduit in the handle;

whereby rotation of the handle in one direction less than 360 degrees relative to the casing will open the fluid passage through the handle and rotation of the handle in the opposite direction an equal amount will close the fluid passage.

2. The hydrant defined in claim 1 wherein the ceramic disk valve is a stack comprising a fixed disk positioned in and fixed in rotational position relative to the cartridge body, and a rotating disk abutting the fixed disk in face to face relation and operatively connected with the stem.

3. The hydrant defined in claim 2 wherein each disk has oppositely disposed quarter sector apertures so that upon rotation of the handle about 90 degrees, the hydrant will be fully open or fully closed, depending upon the direction of rotation.

4. The hydrant defined in claim 2 wherein each disk has a semicircular aperture so that upon rotation of the handle about 180 degrees, the hydrant will be fully open or fully closed, depending upon the direction of rotation.

5. The hydrant defined in claim 1 wherein the casing includes a flexible hose between the cartridge body and the handle and wherein the stem within the flexible hose is also flexible so that the handle conduit can be selectively positioned to direct fluid at an angle relative to the direction of fluid through the cartridge body.

6. The hydrant defined in claim 1 wherein the open end of the conduit is threaded to enable connection to a hose.

7. A hydrant comprising:

a casing adapted to communicate with a fluid source;

a valve cartridge positioned in the casing, the valve cartridge including a cartridge body having first and second opposite open ends, a ceramic disk valve mounted in the cartridge body, the valve being movable between an open position allowing fluid flow axially through the valve in a first direction from the second open end through the first open end and a closed position blocking fluid flow;

a hollow actuator stem connected with the valve for manipulating the valve between the open position and the closed position, the stem having one end in fluid communication with the first open end of the cartridge body, and the other end extending away from the cartridge body;

a handle rotatably mounted to the casing and operatively connected to the stem, said handle having a conduit therethrough in fluid communication with the stem, said conduit having an open end near the handle, wherein a fluid passage is defined through the cartridge body, the valve, the stem, and through the conduit in the handle; and wherein the casing includes a flexible hose between the cartridge body and the handle and wherein the stem within the flexible hose is also flexible so that the handle conduit can be selectively positioned to direct fluid at an angle relative to the direction of fluid through the cartridge body;

whereby rotation of the handle in one direction less than 360 degrees relative to the casing will open the fluid passage through the handle and rotation of the handle in the opposite direction an equal amount will close the fluid passage.

8. The hydrant defined in claim 7 wherein the ceramic disk valve is a stack comprising a fixed disk positioned in and fixed in rotational position relative to the cartridge body, and a rotating disk abutting the fixed disk in face to face relation and operatively connected with the stem.

9. The hydrant defined in claim 8 wherein each disk has oppositely disposed quarter sector apertures so that upon rotation of the handle about 90 degrees, the hydrant will be fully open or fully closed, depending upon the direction of rotation.

10. The hydrant defined in claim 8 wherein each disk has a semicircular aperture so that upon rotation of the handle about 180 degrees, the hydrant will be fully open or fully closed, depending upon the direction of rotation.

11. The hydrant defined in claim 7 wherein the open end of the conduit is threaded to enable connection to a hose.

* * * * *